March 18, 1969  E. J. SMITH ET AL  3,434,132
INDICATOR ERROR CORRECTION APPARATUS
Filed Oct. 19, 1966  Sheet 1 of 2
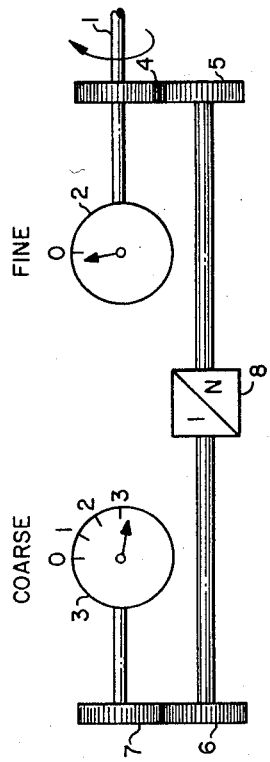
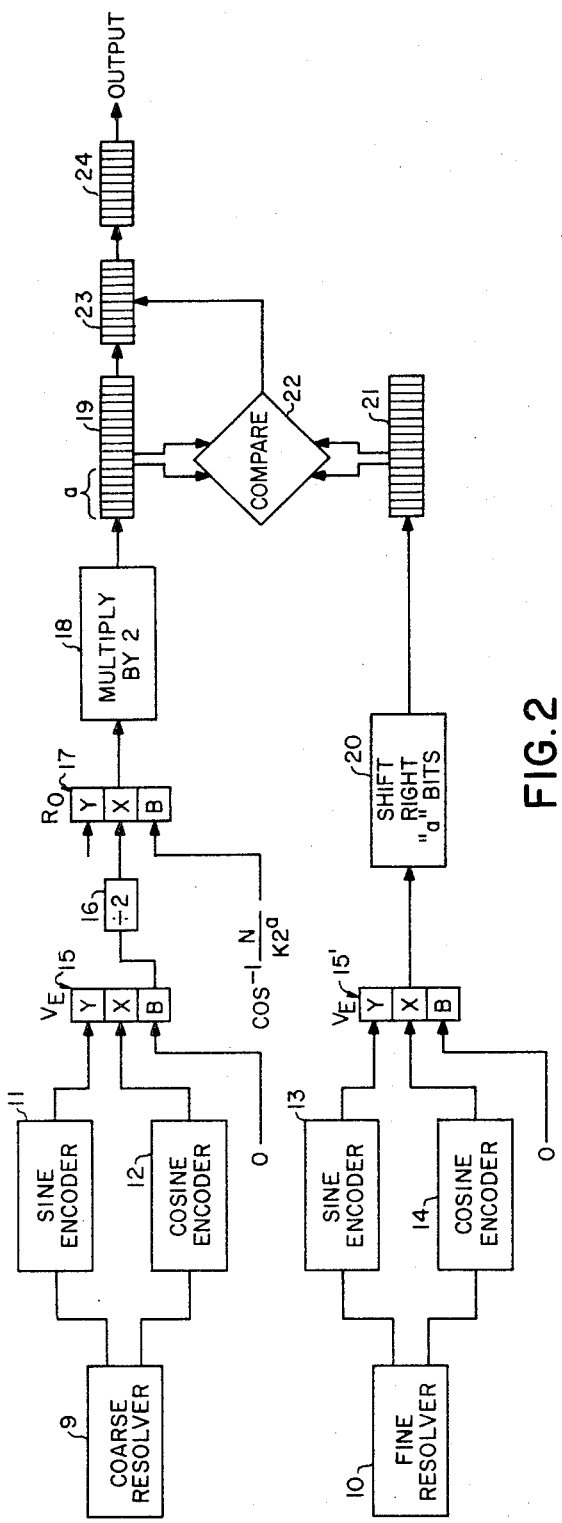
INVENTORS
EDGAR J. SMITH
LELL E. BARNES
BY
Karl Ohralik
ATTORNEY

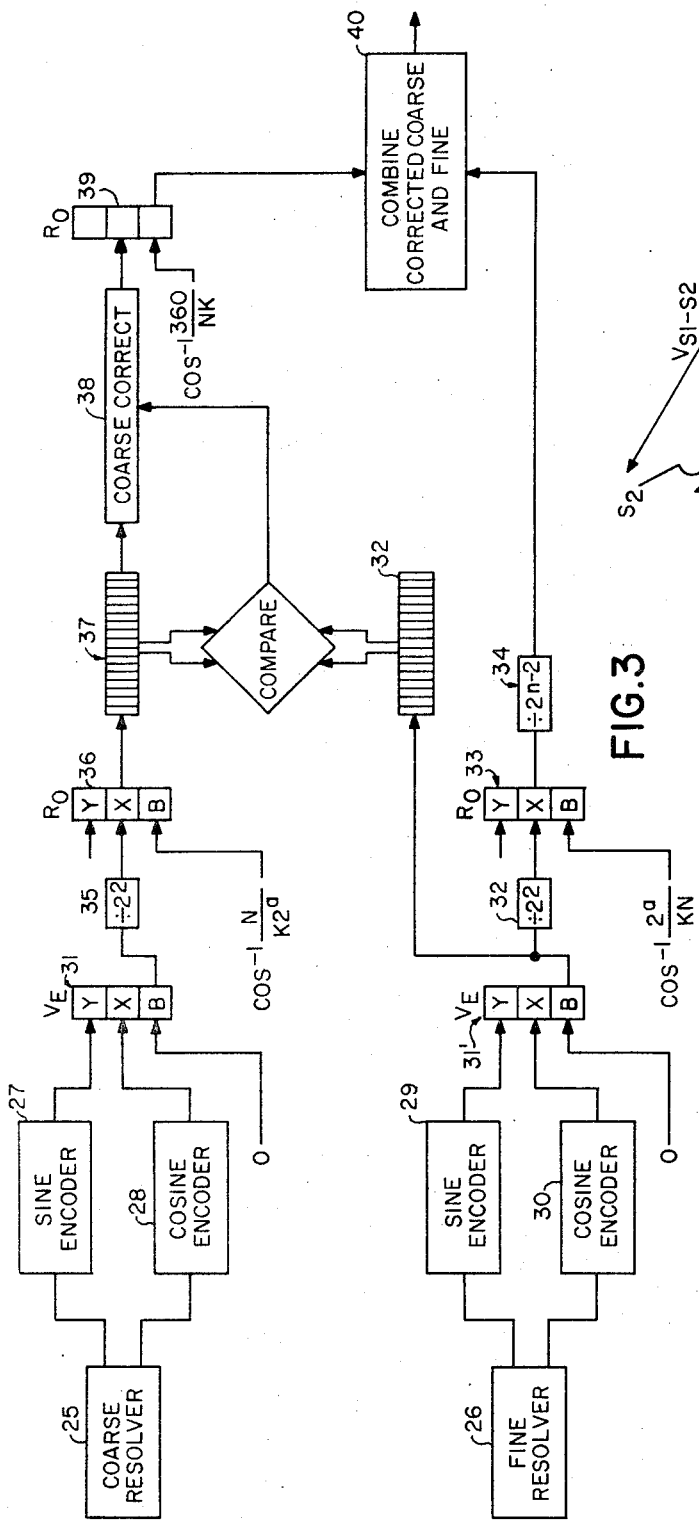
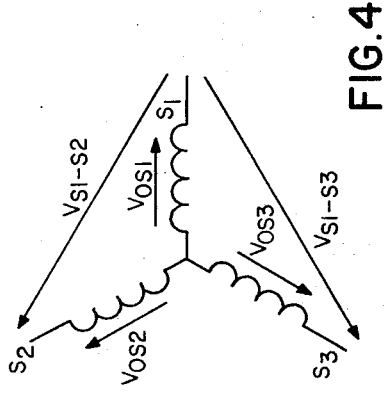

United States Patent Office 3,434,132
Patented Mar. 18, 1969

3,434,132
INDICATOR ERROR CORRECTION APPARATUS
Edgar J. Smith, West Caldwell, and Lell E. Barnes, North Caldwell, N.J., assignors to General Precision Systems Inc., a corporation of Delaware
Filed Oct. 19, 1966, Ser. No. 587,735
U.S. Cl. 340—198    6 Claims
Int. Cl. G08c *25/00, 25/04*

This invention relates to position indicators and more particularly to error prevention in indicators which measure orientation of elements rotatable in a fixed speed ratio.

In certain apparatus, such as servo systems, it is necessary to provide a continuous and accurate indication of the angular position of an element such as a shaft. This requires an indication of the number of complete revolutions and the fractional part of an additional revolution which the shaft has turned. In accordance with the usual practice, to provide such indications electrically, the driven shaft is coupled to drive a first synchro or resolver and through speed-reducing gearing, to drive a second synchro or resolver. Potentials proportional to the sine and cosine of the different synchro or resolver rotor positions are produced either directly from the resolvers or from the synchros through suitable devices, such as Scott T connections or the electronic equivalent thereof. The potentials proportional to the sine and cosine of the shaft angle are usable to provide indications of the number of revolutions of the shaft and fractional parts of additional revolutions. The indicators providing the number of whole or integral revolutions of the shaft are regarded as the "coarse" indicators, and the indicators providing information regarding the fractional turns are regarded as "fine" indicators.

In systems such as described, an inherent defect resides in the possibility of errors in coarse indicators due, for example, to wear or tolerances in gearing or other components or to other slight imperfections in the system. In a system wherein the fine indicator rotates at a speed equal to an integral number of times the coarse indicator, the situation may occur wherein the fine indicator shows a small fractional part of an additional revolution while at the same time the coarse indicator shows a large fractional part of a revolution, or vice versa.

As an example, if the gearing of an indicator apparatus is of a certain ratio N to 1 and a driven shaft has turned slightly more than 2 revolutions, the coarse indicator, due to wear, normal tolerances or for other reason, may show a rotation of slightly less than 2 revolutions, while the fine indicator shows a small additional fractional turn. Thus, the coarse indicator electrically indicates 1 turn and because the fine indicator provides a signal indicative of a small fractional turn, the indicator apparatus as a whole provides signals indicative of slightly more than 1 turn of the shaft.

Accordingly, it is a principal object of this invention to prevent erroneous indications of synchro or resolver positions in systems employing coarse and fine indicators.

It is another object of this invention to derive error correction signals in servo systems having coarse and fine indicators by means which are simple and yet effective.

It is still another object of this invention to derive error correction signals in servo systems having coarse and fine indicators by means which facilitate the accuracy of digital computations.

It is still another object of this invention to facilitate communication between a synchro, resolver or indicator and a digital computing system.

In accordance with this invention, a comparison of the fractional turn indication of the coarse indicator and the indication of the fine indicator is made. A variance therebetween is an indication of the error in the coarse indicator since the fine is regarded as an inherently more accurate apparatus relative to the coarse. To facilitate such a comparison, in one case the coarse is scaled to the fine by multiplying by the ratio N of the turns of the fine to the coarse, and, in the other case, the fine is scaled to the coarse by dividing by the ratio N. To enable digital computations, the signals from the respective sine and cosine windings of both coarse and fine indicators are digitally encoded, and if the ratio N is not an integral power of a predetermined radix R, employed in such digital computation, a further scaling is required and effected by multiplication of either the fine or coarse reading by $R^a$, wherein $a$ is a positive or negative integral power, as the case may be.

The coordinate rotation computing principles and technique disclosed in "The Cordic Computing Technique" by J. Volder in the 1959 proceedings of the Western Joint Computer Conference, p. 257, and "The Cordic Trigonometric Computing Technique" by J. Volder on p. 330 of the September 1959 issue of the IRE transactions on Electronic Computers is particularly well suited for the computations involved and is employed in this description of the invention.

In accordance with such computing principles, each of the fine and coarse indications are encoded and these encodings are vectored so as to, in effect, produce single indications of the respective coarse and fine indicator positions. In the case wherein the coarse indicator position is scaled to the fine for comparison, the fine encoding is presented and stored in a register in the form of the highest possible fraction of a number in the radix R, while the coarse is presented and stored in a register in such scaled form that the first group of bits equal in number to the above-mentioned value $a$, represents the integral number of whole turns of the driven shaft and the remaining bits represent the fractional turn thereof. Comparison logic circuitry compares the highest order bits of each fractional representation, that is, the highest order bits of the fine encoding with the highest order bits of the fractional number of turns of the coarse encoding. The number of highest order bits utilized is that which is sufficient to give a correction of the coarse indicator reading. Based on the assumption that the fine encoding is corect, the deviation therefrom of the coarse encoding, as determined by the comparison of logic circuitry, provides an error signal useful for providing coarse correction.

In the case wherein the fine is referred to the coarse, the number of whole revolutions of the fine shaft is determined from the coarse encoding scaled to the fine by multiplication by $N/R^a$, if N is not an integral power of R, and placing the digitally encoded value in a register wherein the highest order $a+2$ bits represent such whole number of turns and the remaining bits represent the fractional turns. The high order bits, as for example, the two highest order bits ($a+3$ and $a+4$) of the fractional turn representation of the coarse indication in the register are compared with the highest order bits of the encoded and scaled fine indicator to correct the coarse reading. The coarse reading is re-scaled to the coarse and is combined with the fine reading to provide a composite coarse and fine indication of shaft rotation.

While this invention has general application to multispeed systems, that is systems having several indicators each representing the whole number of turns of another of the indicators, for simplicity and brevity a system having only two indicators, a fine and a coarse, will be described, it being understood that the principles of the invention are equally applicable to systems having more indicators. Also, this invention has general application in regard to the number system used, however, preferably the radix R mentioned hereinabove, is of the value 2 so that a binary number system is utilized. With the use of this radix the 2's complement number system is particularly facile when using the cordic computing techniques also mentioned hereinabove. It should be understood, however, that any other radix may be utilized and that the computations may be carried out by other computing techniques as well.

Other and further objects and advantages of this invention will appear from a more detailed description thereof taken with the accompanying drawings, in which:

FIGURE 1 is a schematic represenation of coarse and fine indicators as driven at different speeds by a shaft and having a variance in fractional turn indication;

FIGURE 2 is a schematic block diagram illustrating in greater detail the apparatus for carrying out the indicator correction in a case wherein the coarse indication is scaled to the fine;

FIGURE 3 is a schematic block diagram illustrating in greater detail the apparatus for carrying out the indicator correction in a case wherein the fine indicator is scaled to the coarse; and FIGURE 4 is a schematic diagram of synchro windings together with potentials appearing at such windings.

Referring now to the drawings for a more detailed description of the invention, in FIGURE 1, 1 designates a shaft, the rotation of which is to be indicated by a pair of indicators 2 and 3. The indicators 2 and 3 are shown schematically as being essentially mechanical devices with indicator 2 being driven directly by shaft 1 and indicator 3 being driven through pairs of gears 4–5 and 6–7, the latter pair being driven through a speed reducing gear box 8. In actuality, however, the respective indicators 2 and 3 may not be utilized but rather an electrical indicator signal may be derived from synchros coupled to gears 4 and 7, for example, and with Scott T or other phase changing apparatus or by resolvers which produce signals proportional to the sine and cosine values of the angle of the shaft 1. In the case of the indicator 2, the sine and cosine values will be directly indicated whereas in the case of indicator 3, the sine and cosine values will be indicative of $1/N$ times the angular displacement of the shaft 1. In this figurative drawing, however, a common source of error in servo systems is demonstrated. As shown, the fine indicator indicates a shaft revolution of nearly one complete turn, whereas the coarse indicator 3 indicates shaft revolutions of slightly more than an integral number of turns, namely, 3. This is clearly an inconsistency since in a system with complete accuracy, the indicator 3 would move one revolution indication for every complete revolution of the indicator 2. Thus, if the indicator 2 indicated nearly one complete revolution, the coarse indicator would necessarily indicate nearly some integral number of complete revolutions. Directly combined, the total shaft rotation would be indicated as three complete turns and nearly one additional turn, whereas in reality, the total rotation would be slightly less than three turns or two turns plus a large fractional turn. An alternative situation equally as likely in producing erroneous indications as that represented in FIGURE 1 is that wherein the coarse indicator 3 indicates slightly less than an integral number of complete revolutions and the fine indicator 2 indicates a small fraction of an additional revolution. In cases wherein indicators 2 and 3 as shown in FIGURE 1 may be visually observed, the discrepancy may readily be taken into account mentally, but wherein the information is transmitted to other components, an adjustment must be made by other means.

For a more detailed description of the invention, reference is made to FIGURE 2 of the drawings showing the embodiment of the invention wherein the coarse indicator reading is referred to the fine. A shaft or other rotatable or orientable device, not shown, is geared in a manner shown in FIGURE 1 of the drawings to drive a pair of synchros or resolvers shown at 9 and 10. The rotation is at different speeds related by the ratio N. N may be any suitable whole number depending upon the application and requirement of the system. The signals produced by the coarse and fine resolvers are sine and cosine values corresponding, respectively, to the positions of coarse and fine indicator rotor positions with respect to some reference position. The signals from the coarse resolver 9 are applied to respective sine and cosine encoders 11 and 12 and are digitally encoded in these respective encoders. Similarly, the sine and cosine values of the fine resolver rotor position are digitally encoded in respective encoders 13 and 14. Although the encoders 11–14 are shown as being separate components, a single encoder with suitable multiplexing apparatus capable of switching in succession to the coarse and fine resolvers may be employed.

In carrying out the present invention, the digital angle encoding is preferably compatible with the two's complement number system to facilitate computations in a computer also using this number system. In this number system, an angle of zero value is represented digitally by a comparable zero value, 45 degrees is represented by the number .010, 90 degrees is represented by the digital value 0.100, 180 degrees is represented by the value 1.000, 270 degrees is represented by 1.100. Angles intermediate to those given as examples have intermediate digital values, and it is seen that 0–360° is represented digitally from 0 to $2-E$, wherein E is the value of the least significant bit in the register or number system used.

For producing a single valued indication of each of the respective coarse and fine resolver rotor positions, a "vectoring" operation, as described in the above cited articles by Volder, is performed, wherein the respective sine and cosine encodings are loaded into the respective Y and X registers of a computing apparatus, as shown generally at 15, and the B register is cleared. In a manner described fully in the above-mentioned articles by Volder, a cross-computation of the values in the Y and X registers is performed together with a computation of the angle of the rotor in the angle register B to produce a single number in the B register representing the angle of the coarse resolver. In the same or a similar computing system 15', the respective sine and cosine encodings of the fine resolver are applied to Y and X registers, respectively, and a "vectoring" operation is performed to produce a single value number indicating the angular position of the fine resolver.

In accordance with this embodiment of the invention, the coarse resolver indication is scaled to the fine and for accomplishing this scaling the single valued indication of the coarse resolver position is multiplied by the ratio N since $F = CN$, wherein F and C are fine and coarse values, respectively. However, in utilizing the computing system shown in FIGURE 2, the value N is necessarily scaled to conform to the two's complement number system. Accordingly, it is divided by 2 to a power of $a$ wherein $a$ is an integer such that $N/2^a$ is the largest possible fraction. To perform this scaling in the computing system utilized, the single valued indication of the coarse resolver is "rotated" through an angle whose cosine is $$\frac{N}{K \times 2^a}$$

The effect of such rotation is to multiply the angle by $N/2^a$. The K is introduced into the denominator to compensate for the "growth" in performing the cordic computations. To assure that the registers of the computing system do not overflow, prior to introducing the single valued indication of coarse resolver position, it is divided by 2 as represented by the block 16. This coordinate "rotation" operation is performed as represented by the block 17, and in this operation the Y register is cleared, the X register contains the single valued function divided by 2 and the B register contains the angle whose cosine is $$\frac{N}{K \times 2^a}$$

After performing this multiplication by a rotation operation, the division by 2 at block 16 is adjusted for by a multiplication by 2, as represented by the block 18. The contents are loaded into a register 19 and in this condition it contains in the first $a$ bits, the number of whole revolutions of the shaft, not shown, and in the remaining bits contains the fractional revolution of the shaft.

Referring again to the processing of the fine resolver signal, the contents of the X register is shifted right $a$ bits as indicated at 20 and zeros are introduced into the cells from which the information was shifted. The shifted contents are loaded into a register 21. In this condition, the $a+1$ and $a+2$ bits, respectively, of registers 19 and 21 are compared. Logic circuitry for performing such comparison is shown at 22.

As indicated in the accompanying Truth Table I, adjustments are made to the coarse indicator reading representing the number of whole turns in the two situations wherein: firstly, the coarse reading is a small fraction of a turn and the fine reading indicates a large fraction of a turn; or, secondly, if the coarse reading is a large fraction of a turn and the fine reading is a small fraction of a turn. This is indicated wherein the bits have the largest variance, that is, if the two compared bits of the coarse encoding are 0 0 and of the fine encoding are 1 1 or where the coarse encoding bits are 1 1 and the fine encoding bits are 0 0. The coarse correction is performed in a register 23 and following the correction, the corrected coarse indicator reading and the fine indicator reading are combined in a register, as shown at 24, to give a composite value which is corrected.

TABLE I

| Most Significant Bits of Coarse Fractional Turn | Most Significant Bits of Fine Indicator | Action to Coarse Reading |
| --- | --- | --- |
| 00 | 00 | None |
| 00 | 01 | None |
| 00 | 10 | (*) |
| 00 | 11 | −1 turn |
| 01 | 00 | None |
| 01 | 01 | None |
| 01 | 10 | None |
| 01 | 11 | (*) |
| 10 | 00 | (*) |
| 10 | 01 | None |
| 10 | 10 | None |
| 10 | 11 | None |
| 11 | 00 | +1 turn |
| 11 | 01 | (*) |
| 11 | 10 | None |
| 11 | 11 | None |

* Not applicable as this condition does not occur if indexing system is within ±¼ turn accuracy.

In accordance with the embodiment of invention shown in FIGURE 3 of the drawings, the fine resolver reading is referred to the coarse. In this circuit, coarse and fine resolvers 25 and 26 provide sine and cosine signals, respectively, representing the angular positions of synchro or resolver rotors, not shown, which are turned by a shaft, also not shown. The sine and cosine signals are digitally encoded by pairs of encoders 27–28 and 29–30. These encoders may be supplanted by a single encoder and a suitable multiplexing apparatus for sequentially encoding the outputs of the two resolvers. Single indications of these resolver positions are obtained in "vectoring" operations wherein the sine encodings are loaded into the Y registers of computing systems represented at 31 and 31' and the cosine encoding is loaded into the X registers of such computer. The B register is cleared and the "vectoring" operations performed, resulting in numbers representing respective resolver angles. The fine resolver angle, so determined, is loaded into a register 32 for a later comparison.

The expression interrelating coarse and fine resolver angle is:

$F = NC - A \,(360)$ wherein $A$ is the number of whole revolutions of the fine resolver. In the circuit of FIGURE 3, the fine resolver angle resulting from the computation at 31' is divided by a power of 2, here $2^2$, as shown at 32, to prevent register overflow during ensuing calculations and this angle value is loaded into the X register, the Y register being cleared. A "rotation" operation is performed at 33 after loading the angle $$\cos^{-1} \frac{2^a}{NK}$$

into the B register, resulting is:

$$F' = C \times 2^{a-2} - A \times \frac{360}{N} 2^{a-2}$$

wherein $F'$ is $F$ effectively scaled to another value.

Division by $2^{a-2}$ is performed at 34 resulting in $$F'' = C - \frac{A}{N} \times 360$$

wherein $F''$ is effectively $F/N$. Thus, it is clear that by the addition of the proper value of $$A \times \frac{360}{N} \text{ to } F''$$

the corrected coarse value is determined. For determining $A$, the coarse angle is divided by a power of 2, here $2^2$, as shown at 35, to prevent register overflow, and the scaled value loaded into the X register of the computing system. The Y register is cleared and $$\cos^{-1} \frac{N}{K2^a}$$

loaded into the B register. A "rotation" operations is performed, as shown at 36, which has the effect of multiplying the scaled angle by $N/2^a$ for scaling the coarse angle reading to the fine. The results of such "rotation" are loaded into a register 37. At this stage, the first $a+2$ bits contain the number of whole turns of the servo shaft and the remaining bits contain the fractional part of a turn of this shaft, as determined from the coarse reading. Thus, this fractional turn indication may be slightly in error. The next two bits, i.e., bits $a+3$ and $a+4$, are the two highest order bits of fractional turn in register 37. In a manner described hereinabove with respect to the embodiment of invention shown in FIGURE 2, appropriate adjustment is made by either adding or subtracting a whole turn from the coarse indicator reading if the variance between these pairs of bits shows that one indicator indicates a small fractional turn while the other indicates a large fractional turn or, vice versa. The coarse reading is corrected by such addition or subtraction in a register 38.

For determining the total number of whole turns, the contents of register 38 is "rotated" through the angle $$\cos^{-1} \frac{360}{NK}$$

which has the effect of multiplying such contents by $360/N$, giving as a final result the coarse value. This is performed at 39. To derive a composite corrected indication, the correct coarse and fine reading scaled to coarse are combined at 40. In this case, the composite indication is scaled to the coarse.

In the foregoing description of the invention, the signal producing devices are set forth as being resolvers. However, due to the superiority of synchros as data transmission devices, they are used more extensively. In utilizing synchros in a system with the present invention, at the receiving end of such transmission, resolver-like signals can be produced by using a Scott T transformer connection or the electrical equivalent thereof. Also, it is possible to encode two potentials between the three synchro leads and by proper operations to convert these encodings into sine $\theta$ and cosine $\theta$ values. $\theta$, the angle of the shaft in question, is then found by a vectoring operation.

When a synchro is used, the common connection between the three windings is not available and the sums of potentials of pairs of windings form the encoded potentials.

The three potentials derived from a synchro are as follows:

$$V_{0S1} = V_m \sin \theta$$
$$V_{0S2} = V_m \sin (\theta - 120°)$$
$$V_{0S3} = V_m \sin (\theta - 240°)$$

wherein $V_m$ is a maximum potential.

The encoded potentials are:

$$V_{S1-S3} = -V_{0S1} + V_{0S3}$$
$$= \frac{V_m}{V_R} \left[ \frac{\sqrt{3}}{2} \cos \theta - \frac{3}{2} \sin \theta \right]$$

$$V_{S1-S2} = -V_{0S1} + V_{0S2}$$
$$= \frac{V_m}{V_R} \left[ -\frac{3}{2} \sin \theta - \frac{\sqrt{3}}{2} \cos \theta \right]$$

wherein $V_R$ is a potential reference.

The encodings are combined by addition and subtraction to produce:

$$V_{S1-S2} + V_{S1-S3} = -\frac{V_m}{V_R} 3 \sin \theta$$

$$V_{S1-S2} - V_{S1-S3} = \frac{V_m}{V_R} \sqrt{3} \cos \theta$$

From these equations $$\theta = \tan^{-1} \frac{1}{\sqrt{3}} \left( \frac{3 \sin \theta}{\sqrt{3} \cos \theta} \right)$$

Accordingly, using the synchro directly rather than a resolver, requires only one additional addition, one additional subtraction and one additional rotation operation for multiplication of $$\sqrt{3} \text{ by } V_m \sqrt{3} \cos \theta$$

While there has been described what at present are believed to be the preferred embodiments of this invention, it will be obvious to those skilled in the art that various modifications can be made therein within the scope of the invention.

What is claimed is:

1. In a system having a coarse sensing device for indicating the number of whole revolutions of a shaft and the extent of a fractional revolution thereof and a fine sensing device for indicating the extent of the fractional revolution of the shaft and wherein the speed ratio of said devices is a value, N, an indicator error compensation apparatus comprising, means for scaling the indication of one of said indicators to the other by multiplying the same by a power of the ratio, N, and $R^a$ wherein $a$ is a positive or negative integral number, means for comparing the scaled indication with the other indication and deriving a logical correction signal according to the variation therebetween, means responsive to said variation for correcting the coarse indication and means for combining the corrected coarse and fine indications to provide a correct resultant indication.

2. An apparatus according to claim 1, additionally comprising means responsive to said coarse sensing device for producing signals corresponding to the sine and cosine values of the shaft angular position, means responsive to said fine sensing device for producing signals corresponding to the sine and cosine values of the shaft angular position and means for digitally encoding the respective pairs of sine and cosine values to produce respective composite signals representative of said respective coarse and fine indicator indications.

3. An apparatus according to claim 1, wherein the coarse indicator indication is scaled to the fine by multiplying the same by $N/R^a$, means for storing the scaled coarse indication in digital form, means for comparing the $a+1$ and $a+2$ order bits of the scaled indication with the two highest order bits of the digital fraction representing the fine indicator indication and means for deriving a signal corresponding to the difference between the magnitudes of such compared bits for correcting the indication of said coarse indicator.

4. An apparatus according to claim 1, wherein said radix is 2.

5. In a system having a coarse indicator for indicating the number of integral and fractional revolutions of a shaft and a fine indicator indicating only the fractional part of a shaft revolution, an indicator error compensation apparatus comprising means for scaling the fine indicator indication to the coarse by dividing the fine indication by the ratio N, of fine indicator to coarse indicator, means for scaling the coarse indicator indication to the fine by multiplying the same by $N/2^a$ wherein $a$ is an integer value such that $N/2^a$ is the greatest possible proper fraction, means for comparing the fine angle indication with the scaled coarse indication for determining a variance, means for correcting the coarse indication in accordance with said variance and for simultaneously rescaling the same to provide an accurate coarse indication based on the fine and means for combining the corrected coarse indication and the fine scaled to the coarse to provide a final composite indication.

6. In an analog to binary digital encoder receiving signals proportional to sine and cosine of the angular position of each of a pair of driven shafts, one at a speed N times the other, an ambiguity prevention apparatus comprising means for digitally encoding each of the sine and cosine signals to form binary numbers corresponding to the sine and cosine values, means for combining the encoded sine and cosine numbers from each shaft into a single value representing the angular position of the corresponding shaft, means for scaling one of said single value numbers to the other according to the ratio N, means for comparing the two highest order bits representing the fractional turns of said shafts and means for subtracting or adding a turn to the value representing the number of whole turns of the other of said shafts according to whether the compared bits indicate a large fractional turn of said one shaft and small fractional turn of the other or vice versa.

References Cited

UNITED STATES PATENTS 3,160,803  12/1964  White _____ 340—198

THOMAS B. HABECKER, *Primary Examiner.*

U.S. Cl. X.R.

340—179